United States Patent [19]
Gray

[11] Patent Number: 5,858,322
[45] Date of Patent: Jan. 12, 1999

[54] PROCESS OF PRODUCING CHLORINE DIOXIDE

[75] Inventor: John M. Gray, Roswell, Ga.

[73] Assignee: Eka Nobel Inc., Marietta, Ga.

[21] Appl. No.: 808,753

[22] Filed: Feb. 28, 1997

Related U.S. Application Data

[63] Continuation of Ser. No. 563,354, Nov. 28, 1995, abandoned, which is a continuation of Ser. No. 292,267, Aug. 18, 1994, abandoned.

[51] Int. Cl.⁶ .................................................. C01B 11/02
[52] U.S. Cl. .......................................... 423/478; 205/510
[58] Field of Search .................... 423/478, 479; 205/510

[56] References Cited

U.S. PATENT DOCUMENTS

| | | | |
|---|---|---|---|
| 3,563,702 | 2/1971 | der Vere Partridge et al. | 423/478 |
| 3,733,395 | 5/1973 | Fuller | 423/478 |
| 4,129,484 | 12/1978 | Larsson | 423/478 |
| 4,361,471 | 11/1982 | Kosarek | 204/128 |
| 4,421,730 | 12/1983 | Isa et al. | 423/478 |
| 4,770,868 | 9/1988 | Norell | 423/479 |
| 5,091,166 | 2/1992 | Engström et al. | 423/478 |
| 5,091,167 | 2/1992 | Engström et al. | 423/478 |
| 5,122,240 | 6/1992 | Cowley et al. | 204/101 |
| 5,198,080 | 3/1993 | Cowley et al. | 204/101 |
| 5,227,031 | 7/1993 | Sundblab | 204/104 |
| 5,354,435 | 10/1994 | Kaczur et al. | 204/95 |
| 5,423,958 | 6/1995 | Brännland et al. | 423/478 |

FOREIGN PATENT DOCUMENTS

WO93/25470  12/1993  WIPO.

*Primary Examiner*—Ngoc-Yen Nguyen
*Attorney, Agent, or Firm*—McDermott, Will & Emery

[57] ABSTRACT

The invention relates to a process of producing chlorine dioxide comprising the steps: Providing a reactor with an aqueous acidic reaction medium containing alkali metal chlorate and sulfate; reducing chlorate ions in said reaction medium to form chlorine dioxide; maintaining the reaction medium at subatmospheric pressure sufficient to evaporate water and precipitate alkali metal sulfate; withdrawing chlorine dioxide and evaporated water from the reactor; withdrawing reaction medium containing solid alkali metal sulfate from the reactor and separating the solid material from said reaction medium; transferring reaction medium substantially free from solid alkali metal sulfate to an electrochemical cell in which the acidity of said reaction medium is increased and the content of alkali metal ions is decreased; recycling electrochemically acidified reaction medium to the reactor for producing chlorine dioxide; and adding make up alkali metal chlorate and sulfuric acid.

20 Claims, 1 Drawing Sheet

5,858,322

PROCESS OF PRODUCING CHLORINE DIOXIDE

This disclosure is a continuation of patent application Ser. No. 08/563,354, filed Nov. 28, 1995 now abandoned which is continuation of patent application Ser. No. 08/292,267, filed Aug. 18, 1994 now abandoned.

BACKGROUND OF THE INVENTION

The present invention relates to a process of producing chlorine dioxide. The process comprises reducing chlorate in an acidic reaction medium, precipitating and removing alkali metal sulfate from the reaction medium which is acidified electrochemically and recirculated to a chlorine dioxide generator.

Chlorine dioxide used in aqueous solution is of considerable commercial interest, mainly in pulp bleaching, but also in water purification, fat bleaching, removal of phenols from industrial wastes etc. It is therefore desirable to provide processes in which chlorine dioxide can be efficiently produced. Since chlorine dioxide is unstable the production normally occurs on-site, for example at pulp- and paper mills.

There are numerous different processes for chlorine dioxide production. Most processes in commercial use involve reaction of alkali metal chlorate, normally sodium chlorate, in an acidic medium with a reducing agent such as hydrogen peroxide, methanol, chloride ions or sulfur dioxide. The acidity is generally provided by sulfuric acid. Since alkali metal is introduced with the chlorate it also has to be removed from the system. This can be achieved in highly efficient processes run at subatmospheric pressure and involving formation of solid sodium sulfate as a by-product which traditionally has been used in the pulp- and paper mills. Such processes are described in, for example, U.S. Pat. Nos. 4,770,868, 5,091,166 and 5,091,167.

However, modern technology has reduced the need for sodium sulfate in the pulp industry and it is hard to find use for all sodium sulfate that is obtained. Thus, although some sodium sulfate still is needed in the pulp mills, a great deal of the formerly valuable by-product is now regarded as a useless waste material.

It has been disclosed that sodium sulfate obtained in chlorine dioxide production can be converted to sulfuric acid and sodium hydroxide in electrochemical cells.

U.S. Pat. No. 4,129,484 discloses a process of producing chlorine dioxide in which waste solution containing sulfuric acid and/or sodium sulfate is withdrawn from the reactor and acidified electrochemically.

U.S. Pat. No. 5,198,080 and 5,122,240 disclose a process of producing chlorine dioxide involving crystallisation and withdrawal of solid sodium sesquisulfate. At least some of the sesquisulfate is dissolved in water and acidified electrochemically. The process is complicated since it requires that the sodium sesquisulfate first is precipitated and separated from the reaction medium and then it must be dissolved again before the electrochemical treatment.

International patent specification WO 93/25470 discloses a process of producing chlorine dioxide in which at least some of the acidity in the reaction medium is provided by chloric acid, thus introducing less alkali metal in the chlorine dioxide reactor.

The main object of the present invention is to provide a process of producing chlorine dioxide in which the amount of solid alkali metal sulfate obtained as a by-product easily can be controlled with regard to the need for alkali metal sulfate in each specific case. It is another object of the invention to provide a process with a reduced number of necessary unit operations.

SUMMARY OF THE INVENTION

The invention relates to a process of producing chlorine dioxide comprising the steps: Providing a reactor with an aqueous acidic reaction medium containing alkali metal chlorate and sulfate; reducing chlorate ions in said reaction medium to form chlorine dioxide; maintaining the reaction medium at subatmospheric pressure sufficient to evaporate water and precipitate alkali metal sulfate; withdrawing chlorine dioxide and evaporated water from the reactor; withdrawing reaction medium containing solid alkali metal sulfate from the reactor and separating the solid material from said reaction medium; transferring reaction medium substantially free from solid alkali metal sulfate to an electrochemical cell in which the acidity of said reaction medium is increased and the content of alkali metal ions is decreased; recycling electrochemically acidified reaction medium to the reactor for producing chlorine dioxide; and adding make up alkali metal chlorate and sulfuric acid. The alkali metal chlorate and the sulfuric acid can be added to the reaction medium before or after the electrochemical cell. Preferably, the sulfuric acid is added after the electro-chemical cell. The alkali metal is suitably selected from sodium or potassium, preferably sodium.

The amount of solid alkali metal sulfate obtained is determined by the amount of sulfuric acid added and this in turn is determined by the degree of acidification in the cell. Thus, at steady state substantially all sulfate added with the sulfuric acid is withdrawn as solid alkali metal sulfate and all alkali metal added is either withdrawn as solid sulfate or removed in the electrochemical cell, for example in the form of alkali metal hydroxide. Acid is consumed during the generation of chlorine dioxide and may also be withdrawn together with the solid alkali metal sulfate if the acidity of the reaction medium is high, for example above about 4.5N. All this acid has to be compensated for by electrochemical acidification and addition of sulfuric acid. If all the acid consumed in the chlorine dioxide reactor is regenerated in the electrochemical cell, no sulfuric acid has to be added and no solid sulfate is obtained. If there is a great demand for solid alkali metal sulfate, the electrochemical cell can be operated with a lower degree of acidification or even be completely turned off and all the acidity be provided with sulfuric acid. Accordingly, the process of the invention offers the advantage that the amount of solid alkali metal sulfate obtained as a by-product can easily be controlled depending on the demand in each specific case by setting the degree of acidification in the cell and providing the rest of the acidity required with sulfuric acid.

In the reactor for producing chlorine dioxide the chlorate ions can be reduced by a reducing agent which is most preferred, but also electrochemical reduction is possible. Suitably, a reducing agent is added to the reaction medium, which reducing agent can be selected from organic substances such as methanol, ethanol, isopropanol, other alcohols or formaldehyde, or from inorganic substances such a hydrogen peroxide or chloride ions. Also mixtures of different reducing agents can be used. Hydrogen peroxide and methanol are the most preferred reducing agents since they offer the possibility of efficiently producing chlorine dioxide substantially without formation of chlorine. Hydrogen peroxide is particularly preferred since high production rate can be achieved at low acidities, for example from about 2 to about 5N, involving the advantage that neutral solid alkali metal sulfate can be obtained. Further, no by products that may damage the electrochemical cell are produced.

Preferably, the chlorine dioxide is produced in a single reaction vessel, generator—evaporator—crystallizer. A suitable reactor is an SVP® (single vessel process) reactor. The reactants are added continuously to the reactor. The alkali metal chlorate is added in an amount of from about 1.5 to about 2 tonne per tonne chlorine dioxide. The concentration of chlorate can vary within wide limits, suitably from about 0.25 moles/litre up to saturation, preferably from about 1.5 moles/litre up to saturation, most preferably from about 2.5 moles/litre up to saturation. The reaction is suitably operated at a temperature of 50°–100° C., preferably 50°–75° C. and at a pressure below atmospheric pressure, suitably from about 40 to about 600 mm Hg, preferably from about 40 to about 400 mm Hg. Then the reaction medium boils and water is evaporated in an amount sufficient to dilute the chlorine dioxide formed to a safe concentration. The acidity in the reactor is preferably maintained from about 1 to about 14N, the most preferred range depending on the reducing agent used. If hydrogen peroxide is used as a reducing agent, the acidity is preferably maintained from about 1 to about 5N. If methanol is used as a reducing agent the acidity is preferably maintained from about 5 to about 11N. The acidity is controlled by setting the degree of acidification in the electrochemical cell and by addition of sulfuric acid. In the reactor, the alkali metal sulfate is continuously crystallized and separated in a suitable manner, preferably by filtration in which case it is the filtrate that is transferred to the electrochemical cell.

The chlorine dioxide producing reactions are favoured by the addition of small amounts of catalysts to the reactor. Preferred catalysts belong to the groups VB–VIII, IB, IVA and VIIA of the Periodic Table of the elements. High activity can be achieved by compounds containing V, Nb, Cr, Mn, Fe, Ru, Os, Ni, Pd, Pt, Cu, Ag, Ge, Sn, Pb, Br, and I, either separate or in combinations.

Although not necessary, it is possible to add small amounts of chloride ions, preferably in the form of alkali metal chloride, so as to maintain the concentration thereof in the reaction medium within the range from about 0.001 up to about 0.8 moles/liter.

Any suitable electrochemical cell enabling acidification of the reaction medium can be used, for example combined electrolysis/electrodialysis cells or electrodialysis cells arranged in stacks. Normally, a cell comprising an anode compartment and a cathode compartment divided by at least one ion selective membrane is best suitable. In addition to an anode- and a cathode compartment, such a cell may comprise one or several compartments in the middle. It is also possible to use bi-polar membranes, particularly in electrodialysis stacks. Any standard type of electrodes can be used. For instance, the anode can be DSA $O_2$™ and the cathode can be Ni. Also gas electrodes such as Hydrina™ can be used. Further, standard polymeric ion-exchange membranes can be used, but also high ion conducting membranes such as ceramic membranes can be useful. In most cases, it is suitable to operate at a current efficiency from about 50 to about 90%, preferably from about 60 to about 85%. The current efficiency refers to the withdrawal of alkali metal ions from the reaction medium to be acidified in the electrochemical cell. If alkali metal hydroxide is produced in the electrochemical cell, the current efficiency for withdrawal of alkali metal ions is equivalent to the current efficiency for alkali metal hydroxide production.

In one preferred embodiment, the aqueous solution to be acidified is supplied to the middle compartment of a three chamber cell comprising two cation-exchange membranes. Preferably, water or an aqueous solution containing sulfuric acid is supplied to the anode compartment and water or an aqueous solution containing alkali metal hydroxide is supplied to the cathode compartment. In such a cell, hydrogen ions are generated in the anode compartment and passed through the membrane into the middle compartment replacing alkali metal ions passed into the cathode compartment. In the anode compartment oxygen gas is produced, while hydrogen gas and hydroxide ions are produced in the cathode compartment. The advantage of this embodiment is that substances that may be present in the aqueous solution, such as chlorate, chloride ions and methanol, are not so easily oxidised on the anode, thus avoiding formation of perchlorate, chlorine and formic acid. Further, the life-time of the anode is increased.

It is also possible to perform the electrolysis in electrochemical cells known per se, for example from the already mentioned U.S. Pat. No. 4,129,484. Thus, it is possible to use a three chamber cell in which the middle compartment is defined by an anion exchange membrane and a cation exchange membrane, entering the aqueous solution into the middle compartment, passing chlorate ions and sulfate ions through an anion-exchange membrane into the anode compartment, and withdrawing acidified solution there from. Further, a two chamber cell divided by an cation-exchange membrane could be used, acidifying the aqueous solution in the anode compartment and passing alkali metal ions through the cation-exchange membrane into the cathode compartment. In these cases, it is also possible to produce alkali metal hydroxide, hydrogen gas and oxygen gas as valuable by-products. It is also possible to use a two chamber cell divided by an anion-exchange membrane. The main advantage of using a two chamber cell is that the investment costs are lower.

The reaction medium withdrawn from the reactor is normally saturated in respect of alkali metal sulfate. In order to avoid problems with precipitations in the electro-chemical cell, it may be appropriate to dilute it slightly by adding water after the solid alkali metal sulfate has been separated off to a sulfate concentration below saturation. If the separation is performed by filtration, sufficient dilution may be achieved by washing the filter cake with water. However, it is favourable that the content of sulfate in the reaction medium entering the electrochemical cell exceeds about 3 moles/liter, preferably 4 moles/litre since it has been found that the current efficiency increases with the sulfate concentration. It is advantageous if the molar ratio $H^+:SO_4^{2-}$ is within the range from about 0.5 to about 1.3, preferably from about 0.7 to about 1.1. A low molar ratio has been found to favour the current efficiency. However, if the molar ratio is too low, it has been found that only limited amounts of chlorate can be dissolved in the reaction medium.

BRIEF DESCRIPTION OF THE DRAWING

For a full understanding of the invention, the following detailed description should be read in conjunction with the drawing, wherein.

DETAILED DESCRIPTION OF THE PREFERRED EMBODIMENTS

Figure 1:
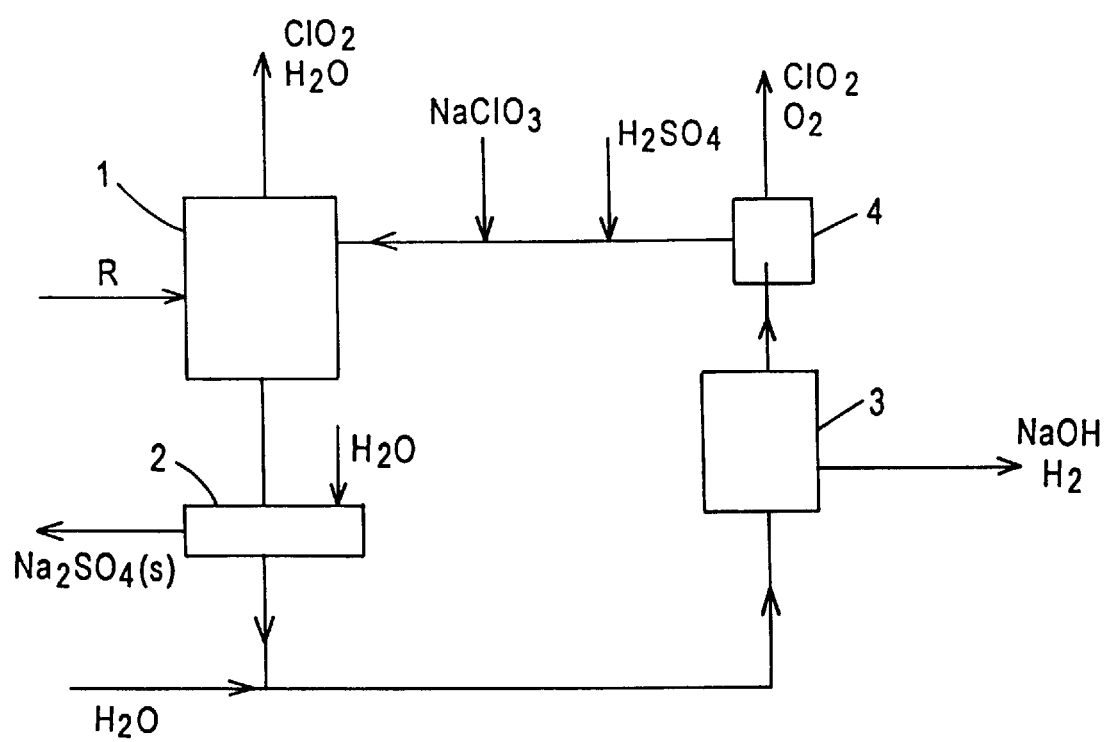
FIG. 1 is a schematic representation of one embodiment of the invention.

The invention will now be illustrated with reference to the drawing. FIG. 1 schematically shows a preferred embodiments of the invention. The invention is, however, not restricted to what is described below, and it is apparent to those skilled in the art that many other embodiments can be employed within the scope of the claims.

Referring to FIG. 1, a preferred system for producing chlorine dioxide comprises an SVP®-reactor 1 containing an aqueous reaction medium in which chlorate ions, sulfate ions, hydrogen ions and sodium ions are present. Heat is supplied in any suitable manner, for example by circulating reaction medium through a heater (not shown). A reducing agent R, preferably hydrogen peroxide or methanol, is supplied to the reaction medium while generated chlorine dioxide is withdrawn as a gas together with evaporated water. In the mean time, solid sodium sulfate forms. The withdrawn gas is preferably transferred to a condenser (not shown) in which some of the water is condensed and then to an absorber (not shown) in which the chlorine dioxide is dissolved in water. In order to avoid reaching the explosion limit of chlorine dioxide, an inert gas is often added before the condenser.

In the reactor 1, the absolute pressure is preferably from about 75 to about 400 mm Hg and the temperature is preferably from about 50° to about 85° C. If methanol is used as the reducing agent R, the reaction medium preferably contains from about 2 to about 4.5 moles/litre of chlorate, from about 5 to about 7 moles/litre of sulfate, from about 8 to about 11 moles/litre of sodium and has an acidity from about 5.5 to about 7N. If hydrogen peroxide is used as the reducing agent R, the reaction medium preferably contains from about 2 to about 4.5 moles/litre of chlorate, from about 4 to about 6 moles/litre of sulfate, from about 8 to about 11 moles/litre of sodium and has an acidity from about 3.5 to about 5N.

Reaction medium containing solid sodium sulfate is continuously withdrawn from the reactor 1 to a filter 2 on which the solid material is separated and removed as salt cake. If the acidity in the reaction medium is less than about 4.5N, it is possible to obtain neutral sodium sulfate, if the acidity is higher, sodium sesquisulfate is normally obtained. The saturated reaction medium free from solids is diluted with water which partly or completely can be done by washing the filter cake with water. The diluted medium transferred to an electrochemical cell 3 in which the acidity is increased and sodium ions are removed, preferably in the form of sodium hydroxide. Normally, also oxygen and/or hydrogen gas is generated in the cell 3.

The acidified reaction medium is withdrawn from the cell 3 and preferably transferred to a gas separator 4 in which chlorine dioxide, and optionally other gases formed such as oxygen, are withdrawn and preferably mixed with the chlorine dioxide withdrawn from the reactor 1. The mixing of the two chlorine dioxide streams can be performed at any suitable place, for example in the reactor 1, or before or after the condenser (not shown). The liquid phase from the gas separator 4 is supplied with sodium chlorate and sulfuric acid and recycled to the reactor. It is also possible to recirculate some of the liquid phase back to the cell 3.

The sulfuric acid is added in an amount sufficient to maintain the desired acidity in the reaction medium. As each mole of sulfuric acid will form one mole of sodium sulfate, the amount of sodium sulfate obtained depends on the degree of electrochemical acidification. If the demand for solid sodium sulfate is low, then the electrochemical cell 3 can be set to operate at a high degree of acidification, decreasing the need for addition of sulfuric acid.

I claim:

1. A method for regulating the continuous production of alkali metal sulfate in a process of producing chlorine dioxide comprising the steps of:

(a) reducing in a reaction vessel chlorate ions in a reaction medium having an acidity level and also containing alkali metal ions and sulfate ions, thereby forming chlorine dioxide and alkali metal sulfate;

(b) recovering the chlorine dioxide formed in step (a);

(c) withdrawing a portion of the reaction medium and the alkali metal sulfate from step (a) and treating said portion electrochemically to increase the acidity thereof and remove alkali metal ions therefrom, said portion of the reaction medium being substantially free from solid material;

(d) recycling acidified reaction medium from step (c) to the reaction vessel in step (a);

(e) adding alkali metal chlorate to the process to make up for chlorate ions consumed in step (a);

(f) adding sulfuric acid to the process at a rate corresponding to a set point to thereby maintain a corresponding output of alkali metal sulfate produced in step (a), wherein the degree of electrochemical acidification in step (c) is sufficient to increase the acidity of the reaction medium to make up the difference between the acidity contributed by said make up sulfuric acid and said acidity level in said reaction medium in step (a);

(g) changing the set point to result in an output of alkali metal sulfate different from the set point of step (f); and (h) repeating steps (a) to (f); wherein step (g) can optionally be repeated and step (h) is repeated after each step (g).

2. A process as claimed in claim 1, wherein the content of sulfate in the reaction medium entering the electrochemical cell exceeds about 3 moles/liter.

3. A process as claimed in claim 2, wherein the content of sulfate in the reaction medium entering the electrochemical cell exceeds about 4 moles/liter.

4. A process as claimed in claim 1, wherein the molar ratio $H^+:SO_4^{2-}$ in the reaction medium entering the electrochemical cell is within the range from about 0.5 to about 1.3.

5. A process as claimed in claim 4, wherein the molar ratio $H^+:SO_4^{2-}$ in the reaction medium entering the electrochemical cell is within the range from about 0.7 to about 1.1.

6. A process as claimed in claim 1, wherein the chlorate is reduced by a reducing agent selected from hydrogen peroxide or methanol.

7. A process as claimed in claim 6, wherein hydrogen peroxide is used as a reducing agent.

8. A process as claimed in claim 1, wherein the reaction medium is maintained at a pressure from about 40 to about 600 mmHg.

9. A process as claimed in claim 1, wherein the acidity in the chlorine dioxide reactor is maintained from about 1 to about 14N.

10. A process as claimed in claim 9, wherein the acidity in the chlorine dioxide reactor is maintained from about 1 to about 5N.

11. A method for regulating the continuous production of alkali metal sulfate in a process of producing chlorine dioxide comprising the steps of:

(a) reducing in a reaction vessel chlorate ions in a reaction medium having an acidity level and also containing alkali metal ions and sulfate ions, said reaction medium being maintained at subatmospheric pressure sufficient for evaporating water and precipitating alkali metal sulfate, thereby forming chlorine dioxide and solid alkali metal sulfate;

(b) recovering the chlorine dioxide formed in step (a);

(c) withdrawing a portion of the reaction medium and the solid alkali metal sulfate from step (a) and removing the solid material from said reaction medium;

(d) treating electrochemically at least a portion of the reaction medium substantially free from solid material obtained in step (c) to increase the acidity thereof and remove alkali metal ions therefrom;

(e) recycling acidified reaction medium from step (d) to the reaction vessel in step (a);

(f) adding alkali metal chlorate to the process to make up for chlorate ions consumed in step (a);

(g) adding sulfuric acid to the process at a rate corresponding to a set point to thereby maintain a corresponding output of solid alkali metal sulfate produced in step (a), wherein the degree of electrochemical acidification in step (d) is sufficient to increase the acidity of the reaction medium to make up the difference between the acidity contributed by said make up sulfuric acid and said acidity level in said reaction medium in step (a);

(h) changing the set point to result in an output of alkali metal sulfate different from the set point of step (g); and (i) repeating steps (a) to (g); wherein step (h) can optionally be repeated and step (i) is repeated after each step (h).

12. A process as claimed in claim 11, wherein the content of sulfate in the reaction medium entering the electrochemical cell exceeds about 3 moles/liter.

13. A process as claimed in claim 11, wherein the content of sulfate in the reaction medium entering the electrochemical cell exceeds about 4 moles/liter.

14. A process as claimed in claim 11, wherein the molar ratio $H^+:SO_4^{2-}$ in the reaction medium entering the electrochemical cell is within the range from about 0.5 to about 1.3.

15. A process as claimed in claim 11, wherein the molar ratio $H^+:SO_4^{2-}$ in the reaction medium entering the electrochemical cell is within the range from about 0.7 to about 1.1.

16. A process as claimed in claim 11, wherein the chlorate is reduced by a reducing agent selected from hydrogen peroxide or methanol.

17. A process as claimed in claim 11, wherein hydrogen peroxide is used as a reducing agent.

18. A process as claimed in claim 11, wherein the reaction medium is maintained at a pressure from about 40 to about 600 mmHg.

19. A process as claimed in claim 11, wherein the acidity in the chlorine dioxide reactor is maintained from about 1 to about 14N.

20. A process as claimed in claim 11, wherein the acidity in the chlorine dioxide reactor is maintained from about 1 to about 5N.

* * * * *